United States Patent
Balluet et al.

(10) Patent No.: US 12,474,564 B2
(45) Date of Patent: Nov. 18, 2025

(54) METHOD FOR MANAGING BLOCKS OF COMMANDS INTENDED FOR A MICROSCOPY IMAGING SYSTEM, AND CORRESPONDING COMPUTER PROGRAM, STORAGE MEDIUM AND DEVICE

(71) Applicants: INSCOPER, Cesson-Sevigne (FR); CENTRE NATIONAL DE LA RECHERCHE SCIENTIFIQUE, Paris (FR); UNIVERSITE DE RENNES 1, Rennes (FR)

(72) Inventors: Maël Balluet, Pace (FR); Jacques Pecreaux, Mordelles (FR); Otmane Bouchareb, Cesson-Sevigne (FR); Marc Tramier, Rennes (FR); Baptiste Giroux, Rennes (FR); Jérémy Pont, La Chapelle des Fougeretz (FR); Olivier Chanteux, Cesson-Sevigne (FR)

(73) Assignees: INSCOPER, Cesson-Sevigne (FR); CENTRE NATIONAL DE LA RECHERCHE SCIENTIFIQUE, Paris (FR); UNIVERSITE DE RENNES, Rennes (FR)

( * ) Notice: Subject to any disclaimer, the term of this patent is extended or adjusted under 35 U.S.C. 154(b) by 428 days.

(21) Appl. No.: 17/801,654

(22) PCT Filed: Feb. 23, 2021

(86) PCT No.: PCT/EP2021/054413
§ 371 (c)(1),
(2) Date: Aug. 23, 2022

(87) PCT Pub. No.: WO2021/170565
PCT Pub. Date: Sep. 2, 2021

(65) Prior Publication Data
US 2023/0161145 A1 May 25, 2023

(30) Foreign Application Priority Data

Feb. 24, 2020 (FR) .................................. 2001798

(51) Int. Cl.
*G06T 7/80* (2017.01)
*G02B 21/36* (2006.01)
*G06V 20/69* (2022.01)

(52) U.S. Cl.
CPC .............. *G02B 21/367* (2013.01); *G06T 7/80* (2017.01); *G06V 20/693* (2022.01); *G06T 2207/10056* (2013.01)

(58) Field of Classification Search
CPC ............. G06T 7/80; G06T 2207/10056; G06T 2207/10148; G06T 2207/10152;
(Continued)

(56) References Cited

U.S. PATENT DOCUMENTS 10,330,911 B2 6/2019 Roul et al.
2007/0253056 A1* 11/2007 Tanemura ............ G02B 21/365
359/363

(Continued)

FOREIGN PATENT DOCUMENTS

EP 1865073 A1 12/2007
FR 3019324 A1 10/2015
WO 2017197217 A1 11/2017

OTHER PUBLICATIONS

International Search Report dated Apr. 15, 2021 for corresponding International Application No. PCT/EP2021/054413, filed Feb. 23, 2021.
(Continued)

*Primary Examiner* — Jamares Q Washington
(74) *Attorney, Agent, or Firm* — David D. Brush; Westman, Champlin & Koehler, P.A.

(57) ABSTRACT

A technique and device for managing blocks of commands intended for a microscopy imaging device configured to
(Continued)

acquire images of a sample. Each block of commands includes driving commands serving to drive a plurality of functional modules of the imaging device. Each command is defined by at least one acquisition parameter. The technique includes executing a first, predefined block of commands to acquire first images, and upon positive verification, by image analysis of a stop condition upon executing the first block, stopping the first block to execute a second predefined block of commands to acquire second images, the commands of the second block being defined by at least one second acquisition parameter, dynamically defined depending on the image analysis.

9 Claims, 4 Drawing Sheets

(58) Field of Classification Search
CPC .. G02B 21/367; G06V 20/693; G06V 10/141; G06V 10/143
USPC .................. 382/291, 317, 226; 359/385, 392
See application file for complete search history.

(56) References Cited

U.S. PATENT DOCUMENTS

| | | |
|---|---|---|
| 2010/0251438 A1* | 9/2010 | Huber .................. G02B 21/008 850/1 |
| 2014/0333723 A1 | 11/2014 | Dowaki et al. |
| 2017/0139196 A1* | 5/2017 | Roul .................. G02B 21/0076 |

OTHER PUBLICATIONS

Written Opinion of the International Searching Authority dated Apr. 15, 2021 for corresponding International Application No. PCT/EP2021/054413, filed Feb. 23, 2021.
French Search Report and Written Opinion dated Nov. 18, 2020 for corresponding French Application No. 2001798, filed Feb. 24, 2020.
English translation of the Written Opinion of the International Searching Authority dated Apr. 30, 2021 for corresponding International Application No. PCT/EP2021/054413, filed Feb. 23, 2021.

* cited by examiner

METHOD FOR MANAGING BLOCKS OF COMMANDS INTENDED FOR A MICROSCOPY IMAGING SYSTEM, AND CORRESPONDING COMPUTER PROGRAM, STORAGE MEDIUM AND DEVICE

CROSS-REFERENCE TO RELATED APPLICATIONS

This Application is a Section 371 National Stage Application of International Application No. PCT/EP2021/054413, filed Feb. 23, 2021, which is incorporated by reference in its entirety and published as WO 2021/170565 A1 on Sep. 2, 2021, not in English.

TECHNICAL FIELD

The invention is in the field of imaging systems. More particularly, the invention relates to a technique for managing driving commands intended for a microscopy imaging device, for the acquisition of images of a sample in real time.

The invention applies especially, but not exclusively, to the field of imaging biological samples by multi-wavelength fluorescence, for the visualisation and analysis especially of cellular dynamic events.

PRIOR ART

The following of this document is more particularly concerned with the problem existing in the field of fluorescence microscopy imaging, with which the inventors of the present patent application have been confronted. The invention is of course not limited to this particular field of application, but is of interest to any technique for managing driving commands of an imaging device that has to deal with a close or similar problem.

The INSCOPER company, in collaboration with the Institute of Genetics and Development of Rennes (IGDR), has developed an imaging solution based on fluorescence microscopy, in order to study dynamics of biochemical (such as cell metabolism, for example) or biophysical (such as dynamics of cell division) activities of living samples. This approach corresponds to a strong demand from biologists who wish to have a spatio-temporal and in vivo analysis technique, adapted to transient biological events, and offering the possibility of accessing functional information on the living cells observed. The understanding of the spatio-temporal dynamics of these cellular events is an important issue to better understand, for example, the origin and mechanisms of some pathologies that are still poorly understood today.

Recent techniques for real-time observation of cellular events are based on the use of a fluorescence microscopy imaging device. Such a device consists in imaging a sample subjected to different excitation wavelengths. It is comprised of a number of functional modules, especially: a light source, an optical microscope, an image capture module, a pair of wavelength selection modules and a driving unit. The microscope conventionally includes a sample magnification optical system, a sample positioning module and a dichroic mirror. As regards the selection modules, they are typically in the form of a rotatably movable disc, provided with a set of optical filters (bandpass or lowpass filters for example), each filter allowing the selection of a desired wavelength according to the filter chosen (excitation or fluorescence wavelength). The optical microscope can further be equipped with a confocal or multi-focal head depending on the application. The acquisition of images of the sample subjected to a given excitation light is performed by means of the capture module.

In order to carry out a multi-wavelength fluorescence acquisition, each functional module of the imaging device is piloted by means of sequence of commands issued successively by the driving unit, so that each of these modules carries out the function associated therewith in view of an image acquisition sequence. A sequence of commands typically comprises a plurality of driving commands serving to drive the different functional modules, each driving command being defined by one or more acquisition parameters. By way of example, a driving command intended for the excitation wavelength selection module means that this module, on receipt of said command, has to select a given excitation wavelength, the acquisition parameter defined by said command being a piece of information representative of the value of the excitation wavelength to be selected.

A conventional and well-known multi-module driving technique for imaging a biological sample with multi-wavelength fluorescence microscopy is set forth in Conrad et al. publication "Micropilot: automation of fluorescence microscopy-based imaging for systems biology" [*Nature Methods* volume 8, pages 246-249 (2011)]. Such a known technique is based on the following servo mechanism:

the driving unit executes several iterations of a first type sequence of commands, called "coarse search sequence", this search sequence being previously defined by a first set of acquisition parameters adapted so that the imaging device acquires a first series of low-resolution, full-field images of the sample;

once this search phase has been completed, the driving unit performs analysis of the low-resolution images and verifies whether an event of interest is detected therein;

and in the event of a positive verification, the driving unit executes a second type sequence of commands, more targeted on the event of interest detected, this sequence being defined by a second set of predefined acquisition parameters, adapted to acquire high resolution images of the sample.

However, this known technique has a number of drawbacks. Although it allows acquisition of biologically living objects, this known technique is not adapted to the capture of dynamic and fast biological phenomena (typically having a lifetime of less than a few seconds). Indeed, the sequential and exhaustive approach to the execution of the driving sequence of commands and the associated image analysis makes it difficult, if not impossible, to acquire the observed phenomena in real time. For example, in the case of some rare and very short-lived biological phenomena (such as the rupture of the nuclear envelope or the metaphase-anaphase transition during cell division, for example), the time required to execute a predefined sequence of commands, the subsequent image analysis and the possible adaptation of the acquisition parameters cannot guarantee the capture of these ephemeral phenomena, as the servo-control of the imaging device in its various functions requires a processing time delay that is much greater than that of the biological phenomenon. Therefore, a number of images of the sample are acquired without interest for the rest of the experimentation. This unnecessarily weighs down data processing and implies a consequent analysis time, making the chances of observing and capturing these ephemeral phenomena greatly reduced. In addition, it unnecessarily degrades the sample.

Finally, the lack of flexibility of the sequence of commands management mechanism implemented by the driving unit, as well as the high number of software layers executed by the same, make this microscopy system relatively slow and complex to implement in practice.

It would therefore appear to be of particular interest to have a technique which allows more efficient driving of the imaging device so as to increase the chances of imaging an event of interest in a sample, and in particular an event of interest having a short duration.

SUMMARY OF THE INVENTION

One purpose of the invention, in at least one embodiment, is especially to overcome these various drawbacks of the state of the art.

In one particular embodiment of the invention, there is provided a method for managing blocks of commands intended for a microscopy imaging device configured to acquire images of a sample, each block of commands comprising a plurality of driving commands for driving a plurality of functional modules of said device, each command being defined by at least one acquisition parameter, said method comprising a step of executing at least one iteration of a first predefined block of commands to acquire at least a first image of said sample. The method is such that it further comprises the following steps, upon positive verification, by image analysis of said at least a first image, of a first stop condition during a current iteration of said first block:

stopping said current iteration of said first block; and
executing at least one iteration of a second predefined block of commands to acquire at least a second image of said sample, at least one command of said second block being defined by at least a second acquisition parameter, itself dynamically defined depending on at least one piece of information resulting from said image analysis.

The general principle of the invention is thus based on an innovative mechanism enabling driving of the modules of the device to be servo-controlled in real time to the analysis of the images acquired. This mechanism is based on the possibility of stopping a first, predefined block of driving commands currently executed when a stop condition is verified, in order to immediately switch to at least one iteration of a second, predefined block of commands, the parameterisation of which is dynamically defined depending on the results of the image analysis that has just been performed. Thus, not only is this approach clever because it provides for a stop of a block of commands currently executed (that is without waiting for the end of execution of this block of commands) in order to immediately execute another one, but it is particularly efficient because it takes account of the image analysis carried out in order to adapt the acquisition parameters in real time. Thus, contrary to the conventional method of prior art, the present invention is based on dynamically driving the functional modules, particularly well adapted to the acquisition of transient and rapid events, such as the selective monitoring of biological events of interest in living cells. By "block of commands", it is meant driving commands executed in series (this will be then referred to as a "sequence of commands") and/or driving commands executed in parallel. It should also be noted that a predefined block of commands can be defined with one or more predefined acquisition parameters and/or one or more dynamically defined acquisition parameters (depending on the analysis results of a previous iteration) as well. For example, upon initialising the method, only driving commands previously predefined by the user or the machine are sent to the different relevant functional modules.

According to one particular aspect, the method comprises the following steps, upon positive verification, by image analysis of said at least a second image, of a second stop condition during a current iteration of said second block:

stopping said current iteration of said second block; and
executing at least one iteration of a third predefined block of commands to acquire at least a third image of said sample, at least one command of said third block being defined by at least a third acquisition parameter, itself predefined or dynamically defined depending on at least one piece of information resulting from the analysis of said at least a second image.

Thus, the invention offers the possibility of stopping in cascade the different blocks of commands sent to the imaging device. Indeed, after a first block of commands has been stopped, a second block of commands can itself be stopped for a third block of commands, and so on, based on the aforementioned general principle. The third block of commands—which is to be executed—is defined with dynamically determined acquisition parameters and/or with fully predefined acquisition parameters. The nature (defined or predefined) of the parameterisation as well as the value of the parameters depend on the results of the image analysis performed during the previous iteration(s).

Advantageously, the first and second stop conditions belong to the group comprising: detection of at least one event of interest during said image analysis, absence of event of interest during said image analysis.

Thus, when at least one event of interest is noticed, the method stops the block of commands currently executed (for example a block of commands dedicated to the search for a biological object belonging to some class) to switch directly to at least one iteration of another block of commands (for example a block of commands dedicated to the description of this biological object). And when after N iteration(s) (with N an integer strictly greater than zero) or after a predetermined time period no event of interest is detected, the method can also decide to stop the block of commands currently executed in order to switch directly to another block of commands with a view to modifying the parameters for acquiring images of the sample. This makes it possible to save time and gain in efficiency, in particular when the commands currently executed do not allow acquisition of the desired event of interest.

Advantageously, if a plurality of events of interest are detected, the method comprises, for each event of interest of the plurality:

executing said at least one iteration of the second block for said event of interest;
dynamically defining said at least one second acquisition parameter depending on at least one piece of information resulting from said image analysis associated with said event of interest.

Thus, an image acquisition can then be rapidly performed for each detected event of interest, which is particularly interesting for acquiring accurate images of transient events.

According to one particular characteristic, said at least one piece of information belongs to the group comprising: a piece of information relating to the nature of the at least one event of interest, a piece of information of position of said at least one event of interest. In this way, it is possible to adapt the acquisition parameters depending on the nature of the events of interest detected (due to the fact that they have been recognised as belonging to a predetermined object class) and/or the position of the events of interest detected in the images.

According to another particular aspect of the invention, the driving commands of said first, second and third blocks of commands belong to the group comprising: selection of a sample excitation light source, selection of at least one parameter of a sample excitation light source, selection of sample excitation wavelength, sample spatial displacement, sample image capture, selection of detection wavelength, adjustment of at least one parameter of an optical system. In this way, several functional modules can be called upon to participate in image acquisition. This is referred to as the different functionalities of the imaging device.

According to another particular aspect of the invention, the first, second and third acquisition parameters belong to the group comprising: a piece of data representative of a type of light source to be activated, a piece of data representative of a light power value, a piece of data representative of a number of images to be acquired, a piece of data representative of an acquisition frequency value, a piece of data representative of a value or range of values of excitation wavelengths, data representative of at least one spatial coordinate relating to the sample position, a piece of data representative of a value or range of values of detection wavelengths, data representative of a magnification value of the optical system. In this way, it is possible to vary a large number of acquisition parameters, making the image acquisition process all the more flexible and highly configurable.

In another embodiment of the invention, a computer program product is provided which comprises program code instructions for implementing the aforementioned method (in any of its various embodiments), when said program is executed on a computer.

According to yet another aspect, the technique provided is concerned with a computer program product downloadable from a communication network and/or stored on a computer-readable medium and/or executable by a microprocessor, comprising program code instructions for executing a management method as described previously.

According to one particular implementation, the different steps of the management method are thus implemented by one or more computer software or programs, comprising software instructions to be executed by a data processor according to the technique provided and being designed to command execution of the various steps of the method. Accordingly, the proposed technique is also directed to a program, likely to be executed by a computer or by a data processor, and in particular a secure processor, which program includes instructions for commanding execution of the steps of a method as mentioned above. This program may use any programming language, and may be in the form of source code, object code, or code intermediate between source code and object code, such as in a partially compiled form, or in any other desirable form.

In another embodiment of the invention, there is provided a non-transitory computer-readable storage medium storing a computer program comprising a set of computer-executable instructions for implementing the aforementioned method (in any of its various embodiments). In other words, the technique provided is also directed to a data medium readable by a data processor, and including instructions of a program as mentioned above. The data medium may be any entity or device capable of storing the program. For example, the medium may include a storage means, such as a ROM, for example a CD ROM or a microelectronic circuit ROM, or a magnetic recording medium, for example a hard disc. On the other hand, the data medium may be a transmissible medium such as an electrical or optical signal, which may be conveyed via an electrical or optical cable, by radio or by other means. In particular, the program according to the technique provided can be downloaded over an Internet-type network. In one alternative, the data medium may be an integrated circuit in which the program is embedded, the circuit being adapted to execute or to be used in executing the method in question.

According to one particular embodiment, the technique provided is implemented by means of software and/or hardware components. In this respect, the term "module" may correspond to a software component, a hardware component or a combination of hardware and software components as well. A software component corresponds to one or more computer programs, one or more sub-programs of a program, or more generally to any element of a program or software capable of implementing a function or a set of functions, as described below for the module concerned. Such a software component is executed by a data processor of a physical entity (terminal, server, gateway, router, etc.) and is likely to access the hardware resources of this physical entity (memories, recording mediums, communication buses, electronic input/output cards, user interfaces, etc.). In the same way, a hardware component corresponds to any element of a hardware assembly capable of implementing a function or a set of functions, as described below for the module concerned. It may be a programmable hardware component or a component with an integrated processor for executing software, for example an integrated circuit, a smart card, a memory card, an electronic card for executing firmware, etc. Each component of the system described above naturally implements its own software modules. The various embodiments mentioned above can be combined with each other for the implementation of the invention.

In another embodiment of the invention, there is provided a device for managing blocks of commands intended for a microscopy imaging device configured to acquire images of a sample, each block of commands comprising a plurality of driving commands for driving a plurality of functional modules of said device, each command being defined by at least one acquisition parameter, said device comprising:
  means configured to execute at least one iteration of a first predefined block of commands in order to acquire at least a first image of said sample;
  means configured to verify, by image analysis of said at least a first image, a first stop condition during a current iteration of said first block;
  means configured to decide, in case of positive verification of the first stop condition:
    to stop said current iteration of said first block, and
    to execute at least one iteration of a second predefined block of commands to acquire at least a second image of said sample, at least one command of said second block being defined by at least a second acquisition parameter, itself dynamically defined depending on at least one piece of information resulting from said image analysis.

Advantageously, the management device comprises means for implementing the steps it performs in the management method as described above, in any of its various embodiments.

FIGURES

Further characteristics and advantages of the invention will become apparent from the following description, given as an indicative and non-limiting example, and from the appended drawings, among which:

DETAILED DESCRIPTION OF THE INVENTION

The general principle of the invention consists in implementing a mechanism for stopping sequences of commands currently executed so as to adapt the acquisition parameters in real time and in a fully automatic manner depending on the images that have just been acquired, and to integrate these parameters into the subsequent sequence of commands to be executed. Thus, the combined use of a stop mechanism and acquisition parameters that can be dynamically adapted to the image analysis, makes it possible to carry out a rapid and relevant driving of the functional modules of the device, particularly well adapted to the acquisition of transient and rapid events, such as selective monitoring of biological events of interest in living cells.

In the following, the invention is more particularly described in the context of image acquisition by fluorescence microscopy. Of course, this is an example of a particular application, and this example can be adapted in other ways, such as, for example, differential interference contrast (or DIC), Nomarsky contrast or phase contrast, to other applications without departing from the scope of the invention.

Figure 1:
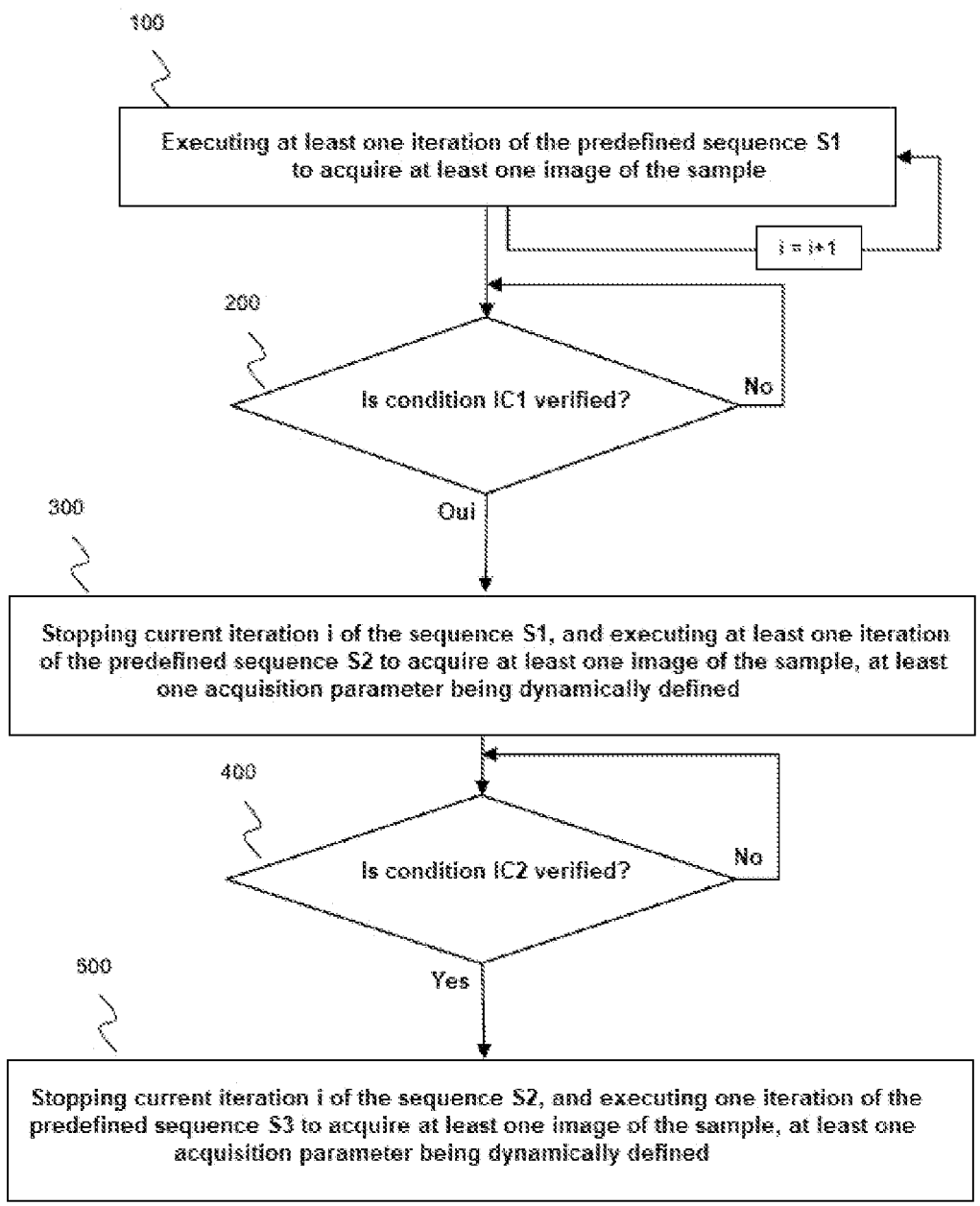
FIG. 1 represents a generic flow chart of one particular embodiment of the method according to the invention.
Figure 2:
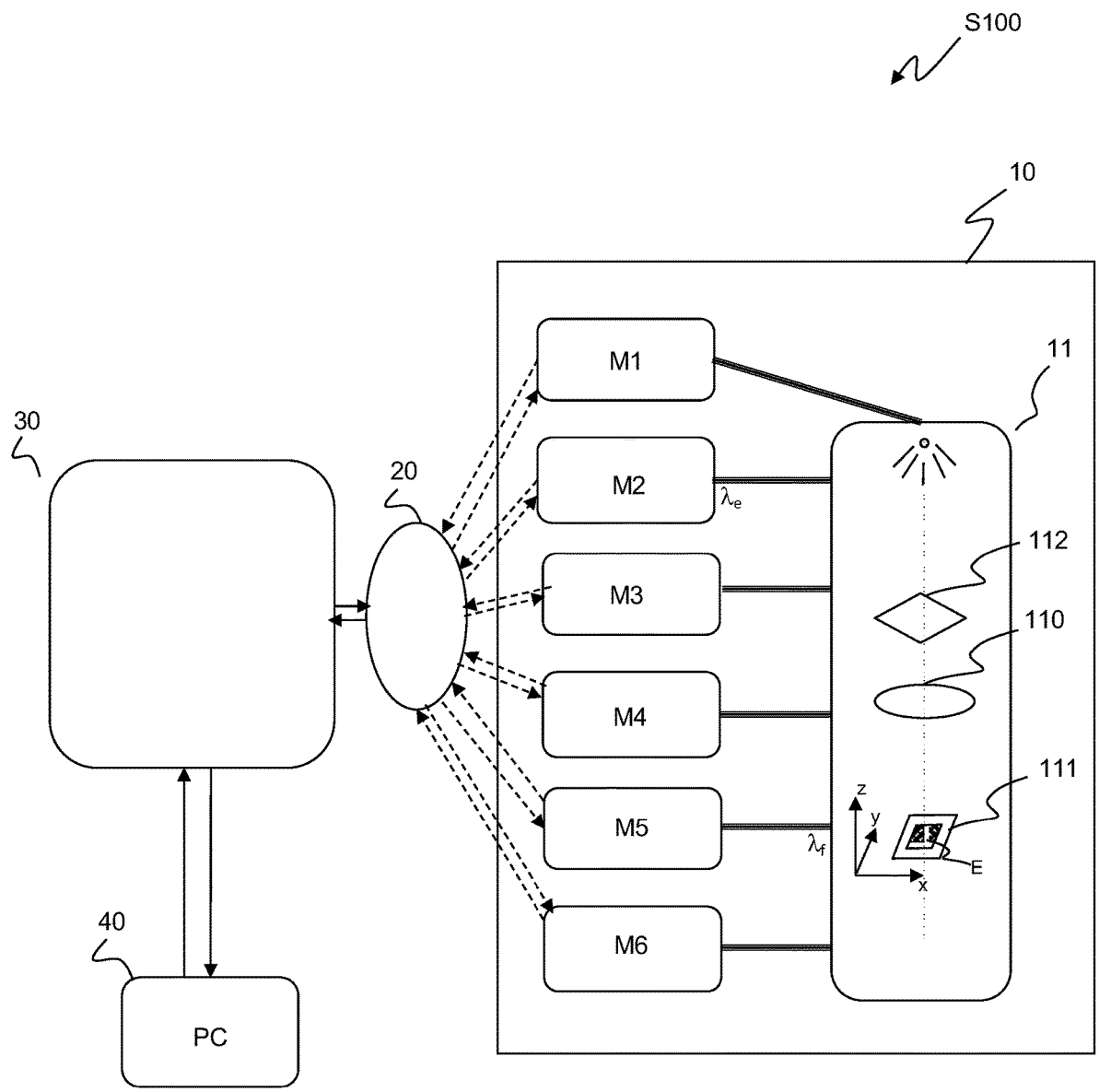
FIG. 2 represents a block diagram of a microscopy imaging system according to one particular embodiment of the invention.

In connection with FIG. 1, the main steps of the management method according to one particular embodiment of the invention are set forth. The method is implemented by a dedicated management device (the principle of which is described in detail below in connection with FIG. 5). Additionally, FIG. 2 illustrates an example of a fluorescence microscopy imaging system in which the management method is implemented.

This imaging system, having reference S100, comprises an imaging device 10, a control module 20, a management device 30 and a computer (PC) 40 equipped with a man-machine interface. The imaging device 10 itself comprises an optical microscope 11 and a set of six peripheral devices, referred to as functional modules. The optical microscope 11 is mainly equipped with a sample magnification optical system 110, a motor-driven sample plate 111 and a dichroic mirror 112. These elements are arranged in relation to each other in such a way that the sample E lies substantially in the focal plane of the optical system.

In the following, it is assumed that the sample to be imaged contains living cells, these cells being intrinsically fluorescent. These living cells have therefore undergone prior preparation either by labelling with a fluorescent substance or by expressing a gene coding for a fluorescent protein. The fluorescent substance chosen here has the property of emitting fluorescent light in the visible range when subjected to a specific excitation light. For example, the labelling used here is based on a green fluorescent protein, for example GFP (Green Fluorescent Protein) with a fluorescence wavelength between 500 and 550 nm (with a maximum value of 505 nm for an excitation wavelength of 480 nm). This is of course an illustrative example, since the use of other excitation and fluorescence wavelengths is of course contemplatable without departing from the scope of the invention. Similarly, the use of other microscopy modalities such as interference contrast, Nomarsky contrast or phase contrast, is also contemplatable without departing from the scope of the invention.

The management device 30 is configured to drive functional modules M1-M6 of the imaging device 10 by means of driving commands issued by the control module 20. Each of the functional modules M1-M6 is adapted to perform a function of its own upon receipt of a driving command from the management device 30 and sent by the control module 20.

The Functional Modules

In the embodiment herein illustrated, the imaging device 10 comprises the following functional modules:

a light emission module M1 adapted to perform a function F1 which is to emit light in the wide field visible range for illuminating and exciting the sample E (for example a Xenon or LED type incoherent white light source adapted to fluorescence imaging of the sample E and cooperating with a wide field beam forming optical system);

an excitation wavelength selection module M2, for example a rotating mobile disc provided with a set of optical filters, adapted to perform a function F2 which is to select, by optically filtering light produced by the selected light source, the wavelength or a range of excitation wavelengths of the sample E (noted $\lambda_e$);

a sample displacement module M3, cooperating with the sample holder 111, and adapted to perform a function F3 which is to displace the sample holder 111 in at least one dimension of space in a predetermined reference frame;

an image capture module M4, for example a CCD (Charged Couple Device) or CMOS (Complementary Metal Oxide Semiconductor) type camera sensitive to the entire visible light spectrum 400-800 nm, adapted to perform a function F4 which is to capture at least one image of the sample E;

a fluorescence wavelength selection module M5, for example a rotatably movable disc equipped with a set of optical filters, adapted to perform a function F3 which is to select, by optically filtering the fluorescent light re-emitted by the sample E, a fluorescence wavelength or range of wavelengths (noted $\lambda_f$ hereafter);

an optical system adjustment module M6, adapted to perform a function F6 which is to adjust at least one parameter of the optical system equipping the microscope 11.

The Driving Commands and their Parameters Generally speaking, a sequence of commands orchestrated by the management device 30 and executed via the control module 20 is comprised of a plurality of driving commands successively sent to the functional modules related to the sequence. Not all pilotable functional modules are necessarily related to a sequence of commands. On the other hand, a driving command may be defined by one or more acquisition parameters.

One particularly advantageous characteristic of the invention lies in the fact that an acquisition parameter according to the invention can be defined in two ways: either the parameter is predefined, that is defined beforehand by the user, or the parameter is dynamically and entirely automatically defined depending on information resulting from an image analysis of the sample.

A list of driving commands and acquisition parameters associated therewith used in the embodiment of FIGS. 1 and 2, is set forth hereafter by way of example:

the driving command CMD1 is intended for the module M1 to perform the function F1. This command CMD1 is defined by a piece of data representative of a light power value "P" (for example 250 mW);

the driving command CMD2, intended for the module M2 to perform the function F2, is defined by a piece of data representative of a value or range of values of excitation wavelengths "$\lambda_e$" (for example the wavelength 480 nm);

the driving command CMD3, intended for the module M3 to perform the function F3, is defined by a piece of data representative of the spatial coordinates "(x,y,z)" of a reference point of the sample holder plate 111 in a predefined reference frame (O; X,Y,Z);

the driving command CMD4, intended for the module M4 to perform the function F4, is defined by a piece of data representative of the number of images to be acquired "n" (n being a non-zero positive integer), an exposure time "$t_{exp}$" and an image capture speed (or frequency) value "v";

the driving command CMD5, intended for the module M5 to perform the function F5, is defined by a piece of data representative of a value or range of values of fluorescence wavelengths "$\lambda_f$" (for example the wavelength 508 nm);

the driving command CMD6, intended for the module M6 to perform the function F6, is defined by a piece of data representative of a magnification value "G" of the microscope 11.

The list set forth above as an illustrative example contains only driving commands of the same type, having reference CMD. Of course, several types of control can be contemplated without departing from the scope of the invention, whether they are digital or analogue. Mention may be made of, for example, but are not limited to, digital commands of the USB, RS232 or FireWire type. A sequence of commands of different types is also contemplatable within the scope of the invention. For example, a USB type driving command may be followed or preceded by, or simultaneously executed with, a TTL or analogue type command.

In the remainder of the description, it is considered that driving of the functional modules implemented here is advantageously based on the multi-module driving technique detailed in patent document FR3019324. This technique is based on the implementation of a mechanism for the bidirectional exchange of driving commands between functional modules themselves, without the use of the central processing unit (PC), in order to activate their own function. Thus, a driving command received by a module is interpreted as a trigger signal for the function associated therewith. This asynchronous approach makes it possible to drive the microscope and its functional modules at the best of their own speed of execution, thus ensuring ultra-fast image acquisition.

Also, according to the particular embodiment set forth herein, the management device 30 directly interacts with the control module 20 to orchestrate driving commands to the functional modules. It is therefore the control module 20 that performs coordinated distribution of the driving commands to each functional module, and reception of their responses. One alternative embodiment without a control module (that is in which the management device 30 directly interacts with the microscope 11) may also be contemplated without departing from the scope of the invention, it being understood that the nature of the driving commands will have to be adapted according to the nature of the modules concerned and the hardware architecture of the imaging system where appropriate.

Prior Configuration of the Imaging System

Before implementing the management method, the user configures the imaging system S100. This configuration is to parameterise, via a man-machine interface, a number of elements necessary for the implementation of the experimental scenario chosen by the user, and especially: the predefined sequence of commands, the acquisition parameters associated therewith, the image processing modalities, and the sequence stop conditions.

Let us take the case of an experimental scenario of fluorescence microscopy of cells undergoing mitosis requiring a set of three predefined sequences S1, S2 and S3, as illustrated, by way of example, in the following Table 1:

TABLE 1

| Sequence S1 | | Sequence S2 | | Sequence S3 | |
|---|---|---|---|---|---|
| Driving commands | Acquisition parameters P1 | Driving commands | Acquisition parameters P2 | Driving commands | Acquisition parameters P3 |
| CMD1 | P = k mW | CMD1 | P = k mW | CMD1 | P = 10 × k mW |
| CMD2 | $\lambda_e$ = 480 nm | CMD2 | $\lambda_e$ = 480 nm | CMD2 | $\lambda_e$ = 480 nm |
| CMD3 | (x, y, z) = (0 + j$x_0$, 0 + j$y_0$, 0) with j = 1 to n | CMD3 | (x, y, z) = (_, _, _) | CMD3 | (x, y, z) = (_, _, _) |
| CMD4 | n = 100, $t_{exp}$ = 0.5 s, v = 2 image/s | CMD4 | n = 100, $t_{exp}$ = 0.5 s, v = 0.1 image/s | CMD4 | n = 1000, $t_{exp}$ = 0.05 s, v = 20 images/s |
| CMD5 | $\lambda_f$ = 500-550 nm | CMD5 | $\lambda_f$ = 500-550 nm | CMD5 | $\lambda_f$ = 500-550 nm |
| CMD6 | G = 10× | CMD6 | G = 100× | CMD6 | G = 100× |

The sequence S1 is a first type, predefined sequence of commands, dedicated to the search for cells in mitosis. It will be executed upon initialising the method to start the experiment. This sequence S1 includes the driving commands CMD1 to CMD6, defined by the acquisition parameters P1 as illustrated in table 1 above. This sequence S1 is characterised by a set of completely predefined parameters allowing the imaging device 10 to acquire low-magnification full-field fluorescence images of different parts of the sample E. Between each image of the sequence S1, a displacement towards a position indexed by the variable j makes it possible to progressively form a mosaic of images I1-$ij$. Once the n images making up the mosaic have been acquired, the system starts a new mosaic indexed by the variable i. The variables i and j are integers strictly greater than zero. The stop condition for the sequence S1 is noted IC1. This condition IC1 is satisfied if at least one cell undergoing mitosis is detected in the current image. In this case, the current acquisition of the mosaic of images is stopped.

The sequence S2 is a second type predefined sequence of commands, dedicated to the monitoring of a cell undergoing mitosis. This sequence S2 comprises the driving commands CMD1 to CMD6, defined by the acquisition parameters P2 as illustrated in Table 1. This sequence S2 is characterised by a set of partially predefined parameters allowing the acquisition, at a moderate frequency, of full field and magnified images of the sample, at the specific position of the cell undergoing mitosis detected during the sequence S1. This set of parameters P2 comprises only acquisition parameters predefined by the user, except for the parameter of the command CMD3 (relating to the position coordinates of the sample E), which will be dynamically defined during the execution of the method. In fact, the invention provides for the possibility of automatically and dynamically parameterising one or more driving commands according to the image analysis carried out in real time on the sample during the sequence S1. The condition for stopping the sequence S2 is noted IC2. This condition IC2 is satisfied if a particular stage (or event) of mitosis is detected in the images (such as the metaphase-anaphase transition to observe the poleward migration of sister chromatids).

The sequence S3 is a third type predefined sequence of commands, characterised by a set of partially predefined parameters for acquiring full-field and magnified images of the sample at very high speed at a particular stage of mitosis (metaphase-anaphase transition). This sequence S3 comprises the driving commands CMD1 to CMD6, defined by the acquisition parameters P3 as illustrated in Table 1. In this set of parameters, only the parameter of the command CMD3 relating to the positioning coordinates (x,y,z) of the sample E is dynamically definable upon executing the method, the other parameters being all predefined in advance. No stop condition of the S3 sequence is defined here. Note the light power which is 10 times higher than that defined in sequences S1 and S2 (the factor k will be taken as being substantially equal to 500 by way of example). Note that the numbering of the driving commands described above does not condition the order in which they are executed by the management device 30. Thus, each sequence will be defined in such a way that the order in which the commands are sent to the functional modules allows optimum driving of these modules, bearing in mind that the same command may be used several times in the same sequence. All these parameterisation elements are loaded via the software interface running on the computer 40, and sent to the management device 30 for implementation of the management method.

Execution of the Management Algorithm According to the Invention

Once the aforementioned configuration has been completed, the user initialises the method of the invention via his/her man-machine interface. It is assumed that the sample E is placed on the sample holder plate 111 and that the sequences of commands are executed consecutively one after the other.

The variable i is hereafter noted as the $i^{th}$ iteration of a given sequence of commands.

In step 100, the management device 30 executes a first iteration of the sequence of commands S1 to acquire a first series I1-$i$ of images of the sample E according to indexing j to obtain a mosaic of images according to the set of acquisition parameters P1.

By way of example, the sequence of commands S1 is defined as follows: CMD1-CMD2-CMD5-CMD6-(CMD3$j$-CMD4)$^n$.

After completing the execution of a sequence S1, the variable i is incremented by the value 1 in order to execute the next iteration (i+1) of the sequence S1.

The first iteration (i=1) of the sequence S1 aims at initiating the search phase for cells in mitosis. During its execution, the driving commands CMD1 to CMD6 are sent to the imaging device 10, via the control module 20, on the basis of the sequence S1 defined above, each functional module receiving the driving command intended for it. If a driving command has been predefined depending on the value of variable j, as is the case for the command CMD3, the value assigned to variable j is taken into account when step 100 is executed.

Figure 6:
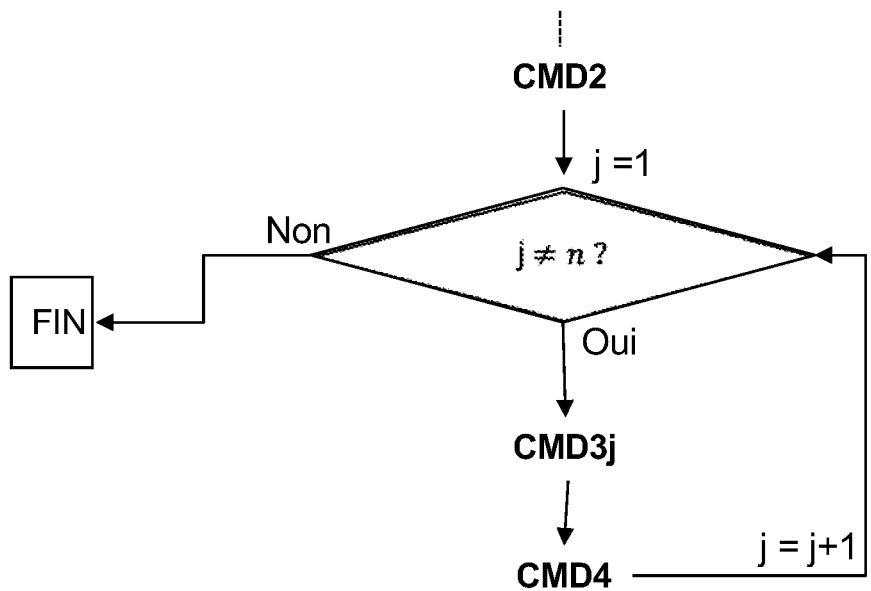
FIG. 6 is a flow chart illustrating one example of implementation of a sequence of commands according to the invention.

Referring to Table 1 above, the variable j associated with the CMD3 command is between 1 and n, with n=100. FIG. 6 illustrates the principle of execution of the commands CMD3$j$ and CMD4 according to the indexing j (noted "sub-sequence" hereafter). Thus, after the CMD2 command has been executed, the algorithm initialises the variable j to 1 and a test is performed to ascertain whether the variable j is different from the value of n (n=100 here). If the test is positive, the command CMD3$j$ is executed for the current value assigned to j to allow positioning of the sample to position (0+jx0,0+jy0,0)), and then the command CMD4 is executed to allow image capture (I1-$ij$) at this position. After execution of the commands CMD3$j$-CMD4, the variable j is incremented by the value 1 in order to execute the next iteration (j+1) of the subsequence CMD3$j$ and CMD4. In other words, as long as the variable j is different from n, an iteration of said sub-sequence is performed in order to continue acquiring images making up the mosaic. In case of a negative test (if j=n), the algorithm in FIG. 6 ends. This means that the mosaic of images I1-1 is completed.

Thus, the first iteration of the sequence S1 acquires a first full-field mosaic of images I1-1 of the sample E, each image I1-1$j$ of the mosaic being associated with a distinct position of the sample holder (0+jx$_0$, 0+jy$_0$, 0).

Step 200 is to verify, by image analysis, whether the stop condition IC1 has been satisfied during the current iteration i of the sequence S1. The stop condition IC1 is satisfied if at least one cell in mitosis is detected in the current image I1-1$j$ of the series of images.

To do this, the management device 30 performs analysis of the current image I1-1$j$ by the module M4, in search of a fluorescent singularity representative of a cell undergoing mitosis. Note that this image analysis is carried out in parallel with the execution of sequence S1.

Of course, various methods known to the skilled person for detecting or recognising objects in an image can be used by the device to carry out image analysis, such as, for example, a deep machine learning method, a method based on the application of a predefined digital filter (Gabor, Gaussian, pattern filter), image segmentation, texture recognition, conversion of photometric image hue and saturation data or even a method of auto-correlation of image characteristics. The skilled person, having the knowledge of these methods, is able to adapt the algorithm executed in step 200 to the characteristics of the invention.

In case of a positive verification, the current iteration of the sequence S1 is stopped and the algorithm proceeds to step 300 for the execution of a new sequence of commands. In case of a negative verification, no stop in the execution of the sequence S1 is performed and the succession of current sequences S1 continues to execute.

In the example herein illustrated, the management device 30 does not detect any cells undergoing mitosis in the first series of images I1-1$j$ (acquired during the first iteration (i=1). As long as the stop condition IC is not verified, the sequences S1 continue to be executed consecutively without being stopped. In other words, the management device 30 iterates step 100 (with incrementation of the variable i (i+1) for the sequence S1 and that of the variable j (j+1) for the subsequence CMD3$j$-CMD4) and step 200 as long as no cell in mitosis is detected.

If after N iterations of the sequence S1 (that is i=N, with n a non-zero positive integer predefined by the user during the configuration of the system (for example N=10)), no cell undergoing mitosis has been detected in the images acquired, the management device anyway decides to stop the sequence S1 currently executed in order to switch directly to another sequence of commands or even to stop the steps of the method for the purpose of reconfiguring the imaging system. Alternatively, this stop decision may be made by the management device not taking account of a predetermined number of iterations, but taking account of a predetermined duration. For example, the management device 30 may decide to stop the executing sequence S1 after 5 minutes of execution thereof.

Figure 3:
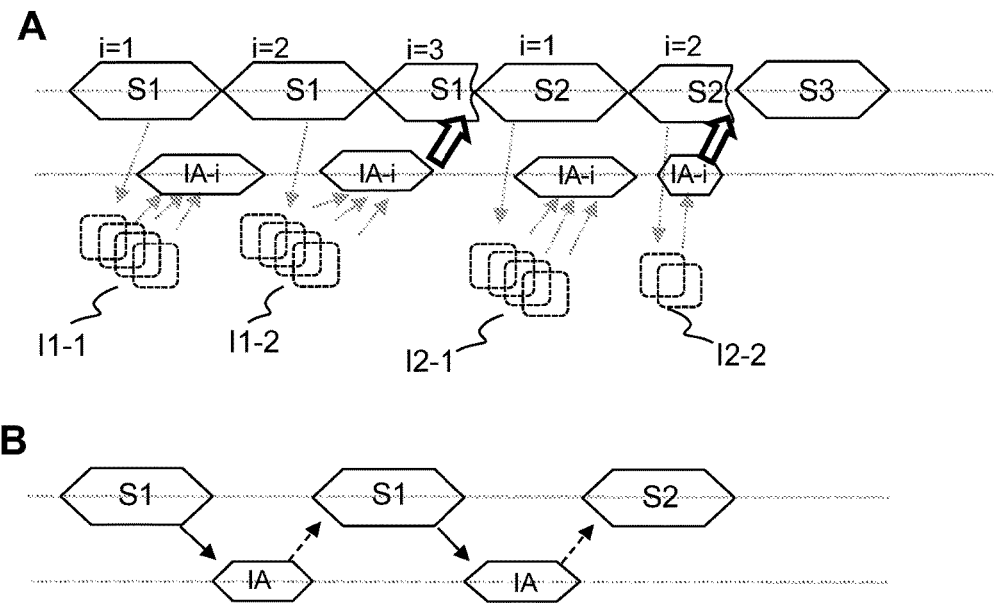
FIG. 3 illustrates a time chart illustrating the principle of the management method according to the invention and compared to the method known in the state of the art described above.
Figure 4:
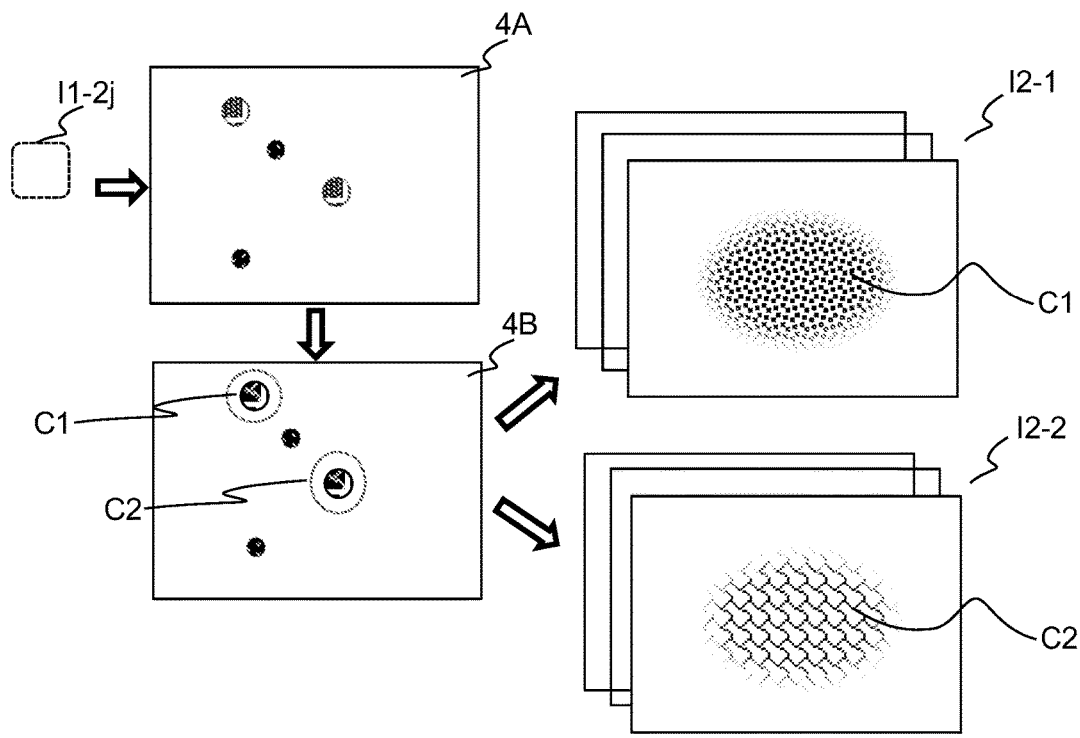
FIG. 4 illustrates a schematic example of images acquired during the method according to the invention.

If the time chart A of FIG. 3 for example is referred to, it is noticed that the stop condition IC1 is only verified during the 3rd iteration (i=3) of the execution of the sequence S1. Indeed, as schematically illustrated in FIG. 4, the management device 30 has detected two cells undergoing mitosis (referenced C1 and C2) in the current full field image I1-2$j$ of the second series of images I1-2, thus satisfying the condition IC1 required in step 200. The management device 30 then extracts information resulting from analysis of the current image I1-2$j$ relating to the characteristics of the cells C1 and C2 detected, and stores it in a local table. This information will help to dynamically define the acquisition parameters of the next sequences of commands according to the invention. For example, the management device 30 determines the coordinates of the position of each of the cells C1 and C2 in the current image I1-2, typically the coordinates (x1,y1) and (x2,y2) for the cells C1 and C2 respectively, and then stores this information in its local table. The management device 30 may decide to return the current image to the computer 40 for display to the user via its man-machine interface. In one alternative embodiment, this information is stored directly in a remote table of the device, for example in a memory of the computer 40.

As illustrated in the time charts A and B of FIG. 3, the analysis IA-2 of the current image I1-2$j$ according to the method is carried out during the current iteration (i=2) of the sequence of commands S1 (Time chart A), contrary to method of prior art according to which the image analysis IA is carried out after completion of an iteration of a sequence of commands (Time chart B).

According to one particular implementation, the principle of which is illustrated in FIG. 4, the image analysis is based on a phase of segmentation of the acquired image using a digital grey level thresholding adapted to the nature of the cell of interest sought. This segmentation phase enables the acquired image to be broken down into different image regions and to highlight cells of potential interest.

FIG. 4A schematically illustrates the image I1-2$j$ of the second series of images I1-2 obtained during the second iteration of the sequence S1, and FIG. 4B represents this same image after applying the aforementioned grey level thresholding. Each image portion of potential interest, known as a thumbnail, is separately processed by the management device 30, and the image data associated with this thumbnail are compared with a predetermined model using, for example, a deep learning algorithm, in order to assign to this thumbnail a probability level of belonging to the class of cells undergoing mitosis. A probability threshold is predefined by the user at the time of configuration of the imaging system depending on the microscopy experiment to be conducted, in particular depending on the false positive or false negative rate desired by the user. Thus, according to one particular implementation, the stop condition is said to be verified if the probability level assigned to a thumbnail (that is a cell of potential interest) is higher than the predefined threshold, for example higher than 80%. In the example herein illustrated, the management device 30 considers that the fluorescent singularities noticed in the image i1-2$j$, materialised by references C1 and C2 in the figure, are cells undergoing mitosis and that consequently the stop condition is verified.

As soon as the stop condition is verified, the management device 30 stops, in step 300, the current iteration i of the sequence S1 (the third iteration in this specific case), and executes, for each of the cells C1 and C2 detected, an iteration of the predefined sequence of commands S2 according to the set of acquisition parameters P2. According to the invention, the set of parameters P2 is automatically adapted to the information resulting from the analysis of the image I1-2$j$. There will therefore be as many sequences S2 to be executed as there are cells detected by image analysis, that is a first iteration of the sequence S2 for the cell in mitosis C1 and a second iteration of this same sequence for the cell in mitosis C2.

As an example, the sequence of commands S2 is defined as follows: CMD1-CMD2-CMD6-CMD5-CMD3-(CMD4)$^n$. Referring to Table 1 above, the variable n is equal to 100, and the acquisition speed of the n images is relatively low (one image every 10 seconds). Additionally, the magnification factor G went from 10× to 100×.

To do this, the management device 30 extracts, from its local table, information associated with the cell C1 resulting from the analysis of the image I1-2$j$, namely the image coordinates of the cell C1 (X1,Y1), and dynamically defines the parameter of the command CMD3 depending on these image coordinates (X1,Y1). In the present example, it is the spatial coordinates (x,y,z) of the sample holder plate 111 that are defined in real time in the command CMD3 depending on the image coordinates of the cell concerned. As the other parameters of the commands of sequence S2 are predefined, they remain unchanged. The management device 30 then executes a first iteration of the sequence of commands S2 to acquire a series I2-1 of n full-field and magnified images of the sample E, targeted on cell C1. The management device 30 returns the images as they are acquired to the computer 40 for display to the user and/or for storage.

Similarly, for cell C2, the management device 30 extracts, from its local table, the image coordinates (X2,Y2) of cell C2 and dynamically defines the command parameter CMD3 depending on these image coordinates (X2,Y2). The management device 30 then executes a second iteration of the sequence of commands S2 (consecutively to the first iteration) to acquire a series I2-2 of n full-field and magnified images of the sample E, this time targeted to cell C2. The management device 30 returns the images as they are acquired to the computer 40 for display to the user and/or for storage.

Thus, this particular implementation allows for separate processing of cells of interest to the experiment. Immediately stopping on the cells of interest and imaging them with adapted acquisition characteristics in real time allows for a faster acquisition of these cells, thereby significantly increasing the chances of observing and capturing ephemeral cellular phenomena. In addition, limiting the amount of irrelevant images makes data processing faster.

A cascaded implementation of the stop mechanism discussed above is set forth hereafter.

After the sequence of commands S1 has been stopped, the method of the invention is configured so that the sequence of commands S2 can itself be stopped during its execution by another sequence of commands, named sequence S3, this sequence stop being conditioned by a second stop condition IC2.

Thus, in parallel with the sequence of commands S2, the device 30 is configured so that a current iteration of the sequence S2 can be stopped upon positive verification, by image analysis, of the stop condition IC2 during the current iteration. This is illustrated in step 400 of the method. The stop condition IC2 is defined by the detection in at least one of the images acquired in the current sequence S2 of a phase of interest in mitosis, such as the metaphase-anaphase transition for example (migration of sister chromatids towards the opposite poles of the cell undergoing mitosis).

The management device 30 therefore performs, during the iteration of the sequence S2, verification, by image analysis of the current image, that the cell is undergoing metaphase-anaphase transition. In case of a positive verification, the current iteration of the sequence S2 is stopped and the algorithm proceeds to step 500 for the execution of the sequence of commands S3. In case of a negative verification, no stop in the execution of the sequence S2 is performed and the current sequence S2 continues to execute without change.

In the example herein illustrated, the management device 30 detects during the second iteration of the sequence S2, by analysis of the images I2-2 acquired, that the cell C2 is in metaphase-anaphase transition. Upon detection, it then proceeds to stop the current iteration of the sequence S2 and to execute the predefined sequence of commands S3, for the purpose of rapid acquisition of this cell division phenomenon.

By way of example, the sequence of commands S3 is defined as follows: CMD1-CMD2-CMD6-CMD5-CMD3-(CMD4)". Referring to Table 1 above, the variable n is equal to 1000 and the acquisition speed of the n images is relatively fast (20 images per second). Additionally, the light power is multiplied by 10. The magnification factor G remains the same (100×).

In this example, the management device 30 dynamically defines the parameter of the command CMD3 depending on information resulting from the analysis of the images I2-2 (based on the aforementioned coordinate calculation principle). For example, it is possible that the management device 30 readjusts spatial coordinates of the sample holder according to the image coordinates relating to the position of the cell C2 in the image, in order to acquire images that are even more focused on the anaphase phenomenon taking place within the cell in mitosis. The images acquired are sent back to the user via the man-machine interface associated with the computer 40. Once the sequence S3 is completed, either the algorithm ends (end of experiment) or new iterations of the sequence S1 are executed by the device.

For the sake of simplicity of description, the sequences of commands set forth in the above example are based on a relatively simple and non-exhaustive parameterisation. Other alternatives for parameterisation and sequencing of more or less complex commands are, of course, contemplatable without departing from the scope of the invention. For example, it could be contemplated to integrate, in a sequence, driving commands for:

positioning the focal plane of the optical system, at different depth levels of the sample E (typically a few hundred nanometres along the z-axis), in order to produce images of "optical sections" of the sample E from which a high-resolution three-dimensional representation could be obtained; and/or adjusting the opening area of a pair of input and output diaphragms in order to control the amount of light illuminating the sample; and/or achieving automatic focusing of the optical system (also called "Autofocus") on the sample (for example in the case of shallow depth of field microscopy imaging); and/or selecting and activating a new light source, for example a laser diode, whose excitation wavelength allows activation and/or deactivation of a protein contained in a cell of interest (method known as photo-manipulation), to photo-convert a fluorescent protein, or to perform microdissection (method known as laser nano-ablation).

All or part of these driving commands may provide for predefinable and/or dynamically definable parameters in accordance with the principle of the invention.

Finally, it may be contemplated that the acquisition modalities are manually modifiable by the user during the execution of the management algorithm, depending on the results of the image analysis obtained: addition, deletion or modification of a predefined sequence, modification, addition, deletion or modification of driving commands, modification of the image processing modalities, etc.

Figure 5:
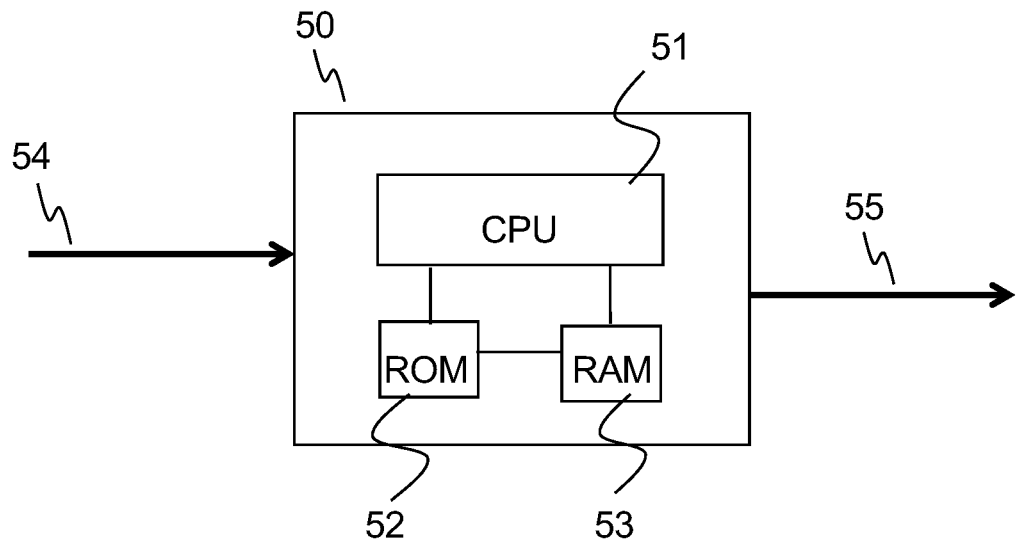
FIG. 5 shows a simplified diagram of the structure of a device capable of implementing the management method according to one particular embodiment of the invention.

FIG. 5 represents, in a schematic and simplified manner, the structure of a management device in one particular embodiment, for example the device 30 represented in FIG. 2 implementing the management method according to the invention (for example the algorithm described above in connection with FIGS. 1 and 2). This device comprises a random-access memory 53 (for example a RAM memory), a central processing unit 51 (noted CPU), equipped for example with a processor or microprocessor, and piloted by a computer program stored in a read-only memory 52 (for example a ROM memory or a hard disc). On initialisation, code instructions of the computer program are, for example, loaded into the random-access memory 53 before being executed by the processor of the processing unit 51. Such a computer program allows execution of the steps of the algorithm of FIG. 1 described above (steps 100 to 500). The processing unit 51 receives as an input imaging system configuration data (represented by arrow 54) entered by the user via the software interface prior to initiating the method. The processor of the processing unit 51 executes the method on the basis of the input data 54 and outputs the corresponding driving commands (represented by the arrow 55) to the functional modules, according to the instructions of the program 52.

This FIG. 5 illustrates only one particular way, among several possible ways, of carrying out the various algorithms detailed above, in connection with FIG. 1. Indeed, the management method according to the invention can be carried out indifferently:

- on a reprogrammable computing machine (a PC computer, a DSP processor or a microcontroller) running a program comprising a sequence of instructions; or
- on a dedicated computing machine (for example a set of logic gates such as an FPGA or ASIC, or any other hardware module).

In the case where the invention is implemented on a reprogrammable computing machine, the corresponding program (that is the sequence of instructions) may be stored in a removable storage medium (such as for example a floppy disc, a CD-ROM or a DVD-ROM) or not, this storage medium being partially or totally readable by a computer or a processor.

The above description concerns the management of sequences of commands successively sent to the functional modules concerned. The present invention is not limited to this particular case of sequencing. It can be applied to all cases where a set of driving commands have to be executed successively and/or in parallel by the management device. Thus, the term "block of commands(s)" will be used to encompass the case of driving commands executed successively or simultaneously, or even a combination of these two execution modes. Sending some driving commands in parallel will make it possible gain in driving speed.

Finally, the present invention is highly applicable to the observation of other events of interest, such as organic and/or inorganic objects, or even biological objects other than cells.

The invention claimed is:

1. A method implemented by a managing device and comprising:

managing blocks of commands for a microscopy imaging device configured to acquire images of a sample, each block of commands comprising a plurality of driving commands for driving a plurality of functional modules of said microscopy imaging device, each command being defined by at least one acquisition parameter, wherein the managing comprises:

executing at least one iteration of a first predefined block of commands to acquire at least a first image of said sample; and upon a positive verification, by image analysis of said at least a first image, of a first stop condition related to at least one event of interest of said sample during a current iteration of said first block:

stopping said current iteration of said first block; and executing at least one iteration of a second predefined block of commands to acquire at least a second image of said sample, at least one command of said second block being defined by at least a second acquisition parameter, the second acquisition parameter being dynamically defined as a function of at least one piece of information associated with said at least one event of interest resulting from said image analysis.

2. The method according to claim 1, comprising:

upon a positive verification, by image analysis of said at least a second image, of a second stop condition during a current iteration of said second block:

stopping said current iteration of said second block; and executing at least one iteration of a third predefined block of commands to acquire at least a third image of said sample, at least one command of said third block being defined by at least a third acquisition parameter, the third acquisition parameter being predefined or dynamically defined as a function of at least one piece of information resulting from the analysis of said at least a second image.

3. The method according to claim 2, wherein the first and second stop conditions belong to the group consisting of:

detection of said at least one event of interest during said image analysis;

absence of an event of interest during said image analysis.

4. The method according to claim 3, comprising:

in response to a plurality of events of interest being detected, for each event of interest of the plurality:

executing said at least one iteration of the second block for said event of interest; and dynamically defining said second acquisition parameter depending on at least one piece of information resulting from said image analysis associated with said event of interest.

5. The method according to claim 3, wherein said at least one piece of information belongs to the group consisting of:

one piece of information relating to a nature of said at least one event of interest;

one piece of information of position of said at least one event of interest.

6. The method according to claim 2, wherein the driving commands of said first, second and third blocks of commands belong to the group consisting of:

selection of a sample excitation light source;

selection of at least one parameter of a sample excitation light source;

selection of a sample excitation wavelength;

sample spatial displacement;

sample image capture;

detection wavelength selection;

adjustment of at least one parameter of an optical system.

7. The method according to claim 1, wherein the first and second acquisition parameters belong to the group consisting of:

a piece of data representative of a type of light source to be activated;

a piece of data representative of a light power value;

a piece of data representative of a number of images to be acquired;

a piece of data representative of an acquisition frequency value;

a piece of data representative of a value or range of values of excitation wavelengths;

a piece of data representative of at least one spatial coordinate relating to a sample position;

a piece of data representative of a value or range of values of detection wavelengths;

a piece of data representative of a magnification value of the optical system.

8. A non-transitory, computer-readable storage medium storing a computer program product comprising program code instructions for implementing a method of managing blocks of commands, when said program is executed on a computer, wherein the method comprises:

managing the blocks of commands, which are configured for a microscopy imaging device configured to acquire images of a sample, each block of commands comprising a plurality of driving commands for driving a plurality of functional modules of said microscopy imaging device, each command being defined by at least one acquisition parameter, wherein the managing comprises:

executing at least one iteration of a first predefined block of commands to acquire at least a first image of said sample; and upon a positive verification, by image analysis of said at least a first image, of a first stop condition related to at least one event of interest of said sample during a current iteration of said first block:
  stopping said current iteration of said first block; and
  executing at least one iteration of a second predefined block of commands to acquire at least a second image of said sample, at least one command of said second block being defined by at least a second acquisition parameter, the second acquisition parameter being dynamically defined as a function of at least one piece of information associated with said at least one event of interest resulting from said image analysis.

9. A device comprising:

a processor; and a non-transitory computer readable medium comprising instructions stored thereon for executing a method of managing blocks of commands when the instructions are executed by a processor, wherein the method comprises:

managing the blocks of commands, which are configured for a microscopy imaging device configured to acquire images of a sample, each block of commands comprising a plurality of driving commands for driving a plurality of functional modules of said device, each command being defined by at least one acquisition parameter, wherein the managing comprises:

executing at least one iteration of a first predefined block of commands in order to acquire at least a first image of said sample;

verifying, by image analysis of said at least a first image, a first stop condition related to at least one event of interest of said sample during a current iteration of said first block; and in case of a positive verification of the first stop condition:
  stopping said current iteration of said first block, and
  executing at least one iteration of a second predefined block of commands for acquiring at least a second image of said sample, at least one command of said second block being defined by at least a second acquisition parameter, the second acquisition parameter being dynamically defined depending on at least one piece of information associated with said at least one event of interest resulting from said image analysis.

* * * * *